(12) United States Patent
Levi (10) Patent No.: US 9,258,309 B2
(45) Date of Patent: Feb. 9, 2016

(54) METHOD AND SYSTEM FOR OPERATING A WIRELESS ACCESS POINT FOR PROVIDING ACCESS TO A NETWORK

(71) Applicant: ZONERIDER NETWORKS LIMITED, Edgware (GB)

(72) Inventor: Russell Levi, Edgware (GB)

(73) Assignee: Bounts Technologies Ltd, London (GB)

( * ) Notice: Subject to any disclaimer, the term of this patent is extended or adjusted under 35 U.S.C. 154(b) by 0 days.

(21) Appl. No.: 14/249,174

(22) Filed: Apr. 9, 2014

(65) Prior Publication Data

US 2015/0074768 A1 Mar. 12, 2015

Related U.S. Application Data

(63) Continuation of application No. 13/127,223, filed as application No. PCT/IB2009/054623 on Oct. 20, 2009, now abandoned.

(30) Foreign Application Priority Data

Nov. 3, 2008 (GB) .................................. 0820108.9

(51) Int. Cl.
*H04L 29/06* (2006.01)
*H04L 29/12* (2006.01)
*H04W 12/06* (2009.01)
*H04W 40/02* (2009.01)
*H04W 72/04* (2009.01)
*H04W 88/16* (2009.01)

(52) U.S. Cl.
CPC ........ *H04L 63/102* (2013.01); *H04L 29/12207* (2013.01); *H04L 61/20* (2013.01); *H04L 63/083* (2013.01); *H04W 12/06* (2013.01); *H04W 40/02* (2013.01); *H04L 29/12339* (2013.01); *H04L 61/2503* (2013.01); *H04W 72/0453* (2013.01); *H04W 88/16* (2013.01)

(58) Field of Classification Search
CPC .......... G06F 17/30873; G06F 2216/15; H04H 20/38; H04H 20/426; H04H 20/92; H04W 4/24
USPC .......... 370/331, 325, 401, 432; 709/229, 224, 709/227, 238
See application file for complete search history.

(56) References Cited

U.S. PATENT DOCUMENTS

| 7,296,091 B1* | 11/2007 | Dutta et al. .................... 709/245 |
| 7,469,294 B1* | 12/2008 | Luo et al. ...................... 709/229 |
| 2005/0163223 A1* | 7/2005 | Klamer et al. ............ 375/240.25 |
| 2005/0182839 A1* | 8/2005 | Geoffrion ...................... 709/227 |
| 2006/0023730 A1* | 2/2006 | Regan et al. .................. 370/432 |
| 2007/0019540 A1* | 1/2007 | Biswas et al. ................. 370/217 |
| 2007/0225019 A1* | 9/2007 | Knox et al. ................... 455/461 |
| 2008/0069065 A1* | 3/2008 | Wu et al. ....................... 370/340 |

\* cited by examiner

*Primary Examiner* — Jamal Javaid
(74) *Attorney, Agent, or Firm* — Graeser Associates International Inc; Dvorah Graeser (57) ABSTRACT

A method is described for operating a single network adapter for use on two different sub-networks of the same type, and a corresponding apparatus. The method comprises setting up a first network address and routing table in the network adapter for use in the first sub-network; setting up a second network address and routing table in the network adapter for use in the second sub-network; receiving data for one of the first and second sub networks, and re-transmitting the data to the other of the first and second sub-network, using the network addresses and routing tables.

19 Claims, 4 Drawing Sheets

METHOD AND SYSTEM FOR OPERATING A WIRELESS ACCESS POINT FOR PROVIDING ACCESS TO A NETWORK

FIELD OF THE INVENTION

This invention relates to a method of operating a wireless access point for providing access to a network. This allows, for example, operation of a wireless access point for providing access to the Internet (commonly know as a "hotspot").

BACKGROUND OF THE INVENTION

Figure 1:
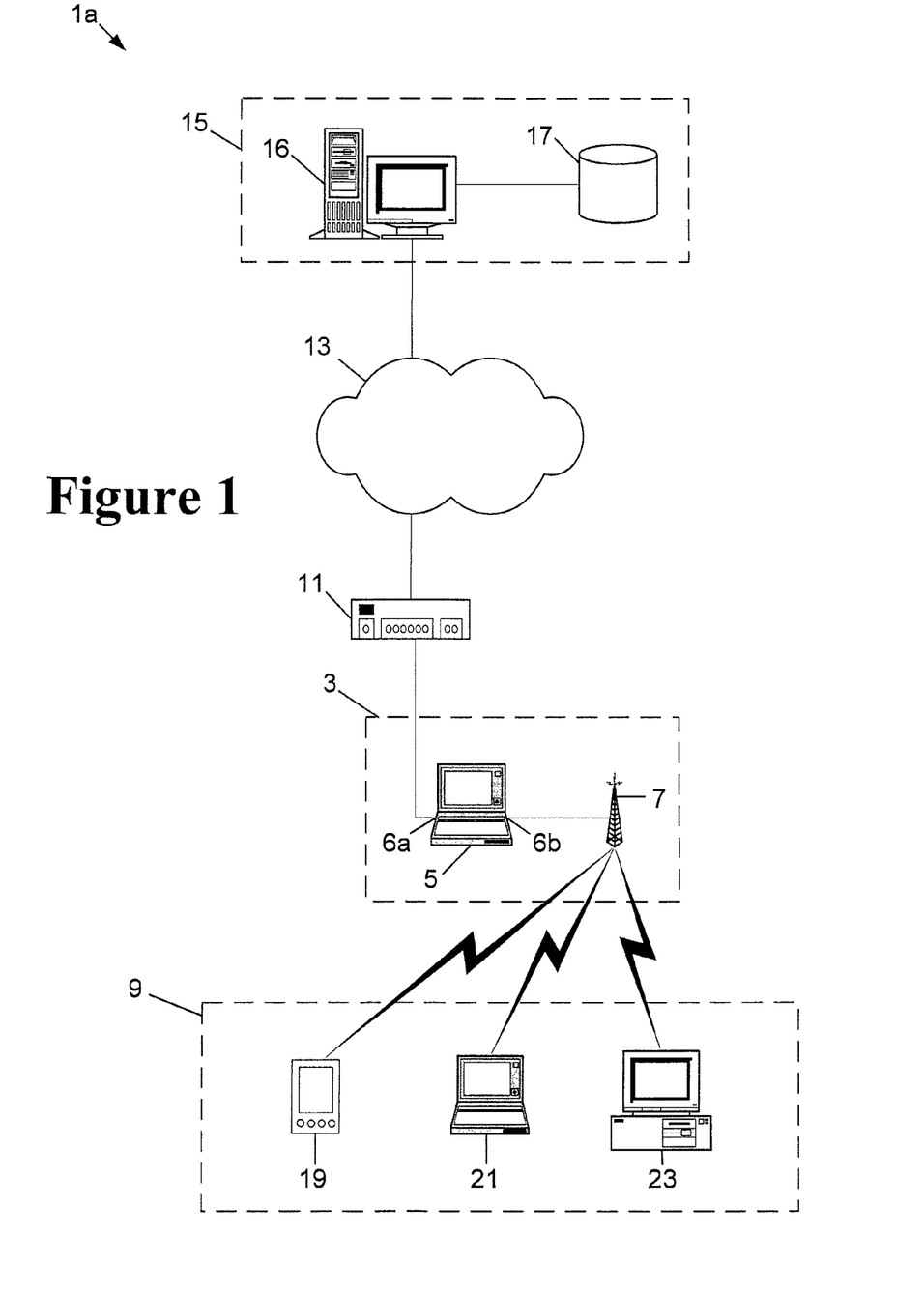
FIG. 1 shows a first known system for providing authenticated wireless access to a network.

A system for connecting a wireless enabled device to a network via a wireless local area network is shown in FIG. 1, and is described in more detail in WO2006/021784. The system 1a comprises a wireless access point 3 connected via a modem 11 to a network 13, such as the Internet, and a server 15. The wireless access point 3 comprises a base station 7 for providing a wireless connection to a wireless enabled device 9 and a wireless access point controller 5 for controlling the connection of the wireless enabled device 9 to the network 13. The modem 11 and base station 7 are connected to the wireless access point controller 5 at ports 6a and 6b respectively of the wireless access point controller 5.

The wireless enabled device 9 may be a personal digital assistant (PDA) 19, a laptop 21, a desktop personal computer 23 or other wireless enabled device. Such wireless enabled devices 9 are typically compliant with the IEEE 802.11 specification and/or the Bluetooth® specification.

The server 15 comprises a server processor 16 and a storage means 17, which may comprise a database. Software is stored in the storage means 17, and can be downloaded to a wireless access point 3. The storage means 17 also stores information about wireless access points 3 and subscription data associated with users of wireless enabled devices 9 subscribing to the network 1a. The wireless access point 3 connects to the server 15 via the network 13. A feature of this system is that any person can set-up and run a revenue generating hotspot.

A wireless access point 3 may be commissioned by downloading and installing software from the server 15 and by sending data from the wireless access point 3 to the server 15 to register the wireless access point 3. The server 15 authenticates connection of a wireless enabled device 9 to the network/Internet 13 via the wireless access point 3 based on matching subscription data provided by the user of the wireless enabled device 9 with subscription data stored in the storage means 17.

In FIG. 1, the wireless access point 3 is connected to the modem 11 by a wired connection, for example, by an Ethernet cable. Alternatively, the wireless access point 3 may be connected to the modem 11 wirelessly. A base station, such as a wireless router, may be connected by an Ethernet cable to the modem 11 and a further base station may be connected to a first port 6a of the wireless access point controller 5. This arrangement may be found, for example, where it is not possible to locate the wireless access point controller 5 close to the modem.

In the system of FIG. 1, two ports 6a, 6b are used on the wireless access point controller 5 of the wireless access point 3, each point 6a, 6b having its own Internet Protocol (IP) address. A disadvantage of this arrangement is that each port 6a, 6b requires a network adaptor, such as a network card. As commonly available personal computers and laptops are not conventionally provided with two network adaptors the requirements for two network adaptors is an impediment to commissioning of conventional wireless access points 3 as shown in FIG. 1.

However, in such prior art hotspot arrangements, it is necessary to have a separate router (for internet access) such as a modem 11 and a wireless access point 3. This invention provides improvements to the system and method described above, allowing the use of a standard wireless router to provide a hotspot for guest access.

SUMMARY OF THE INVENTION

The present invention provides a method of operating a single network adapter for use on two different sub networks of the same type, the method comprising:
  setting up a first network address and routing table in the network adapter for use in the first sub-network;
  setting up a second network address and routing table in the network adapter for use in the second sub-network;
  receiving data for one of the first and second sub-networks, and re-transmitting the data to the other of the first and second sub-network, using the network addresses and routing tables,
  characterised in that
  the first sub-network includes a network gateway and the network adapter is configured as a hotspot controller to control access from the second sub-network to the network gateway,
  the step of receiving data comprises receiving a request from a user via the second sub-network to access the gateway on the first sub-network, verifying the user's access rights, and allowing the user to access the gateway if and only if the user is entitled to access the gateway.

According to a second aspect of the invention, there is provided a computing apparatus for exchanging network data traffic between a first sub-network and a second sub-network, the apparatus comprising:
  a network adaptor;
  a processor;
  a data store storing a driver for the network interface card, the driver being configured to store a first network address and routing table for use in the first sub-network; a second network address and routing table for use in the second sub-network; to receive data for one of the first and second sub-networks, and re-transmit the data to the other of the first and second sub-network, using the network addresses and routing tables,
  wherein the first sub-network includes a network gateway and the apparatus is configured as a hotspot controller to control access from the second sub-network to the network gateway and comprises an authentication controller for receiving a request from a user via the second sub-network to access the gateway on the first sub-network, verifying the user's access rights, and allowing the user to access the gateway if the user is entitled to access the gateway, or blocking the user access to the gateway if the user is not entitled to access the gateway.

There is provided a method of operating a single network adapter for use on two different sub-networks of the same type, the method comprising setting up a first network address and routing table in the network adapter for use in the first sub-network; setting up a second network address and routing table in the network adapter for use in the second sub-network; receiving data for one of the first and second sub-networks, and re-transmitting the data to the other of the first and second sub-network, using the network addresses and routing tables.

The present invention further provides a computing apparatus for exchanging network data traffic between a first sub-network and a second sub-network, the apparatus comprising a network adaptor; a processor; and a data store storing a driver for the network interface card, the driver being configured to store a first network address and routing table for use in the first sub-network; a second network address and routing table for use in the second sub-network; to receive data for one of the first and second sub-networks, and re-transmit the data to the other of the first and second sub-network, using the network addresses and routing tables.

The second sub-network may comprise a NAT routable sub-network, that is subservient to the first sub-network. The first sub-network may include a network gateway. The apparatus may be configured as a hotspot controller to control access from the second sub-network to the network gateway.

The network adaptor may be a single network interface card or module, or other type of network adaptor, configured to connect to a network gateway using the first sub-network and a first network address, and to connect with a user's computer using the second sub-network and a second network address.

The network gateway may be provided by a wireless internet router. The apparatus may include means to generate broadcasts to inform wireless stations that the single network adapter is a gateway (e.g. an internet gateway), and to send the broadcasts to the wireless internet router for forwarding to the wireless network. The apparatus may generate and send these broadcasts on the wireless network at a sufficient rate to override broadcasts from the wireless internet router which indicate the wireless internet router to be an internet gateway.

The apparatus may include means to detect packets automatically on at least one of the first and second sub-networks that are not using the hotspot controller as the network gateway, and to automatically adjust the rate of the broadcasts on the wireless network which specify the network adaptor as the network gateway, according to the number of such packets that are detected. Thus, the rate may be increased when such packets are detected, and decreased if no such packets have been detected for a predetermined time, or according to some other criteria.

The apparatus may include means to receive a user instruction to adjust the rate of generating and sending broadcasts on the wireless network setting the network adapter as the gateway, and adjusting the rate according to the user instruction.

The apparatus may include means to receive a request from a user via the second sub-network to access the gateway on the first sub-network, verifying the user's access rights, and allowing the user to access the gateway if the user is entitled to access the gateway, or blocking the user access to the gateway if the user is not entitled to access the gateway. The apparatus may include means for retrieving locally or remotely stored user subscription information or information about user permissions to access the gateway.

The apparatus may include means for controlling the allocated bandwidth through the gateway for users connecting via the second sub-network. This may be done on a user specific basis, or on a general basis.

The single network adapter may be an Ethernet adapter, and may be installed in a personal computer. Driver software may be provided to configure a standard Ethernet adaptor as an embodiment of the invention, allowing it to exchange network traffic between the first and second sub-networks.

BRIEF DESCRIPTION OF THE DRAWINGS

The invention will now be described further, by way of example, with reference to the accompanying drawings, in which.

DETAILED DESCRIPTION OF THE PREFERRED EMBODIMENT(S)

Figure 2:
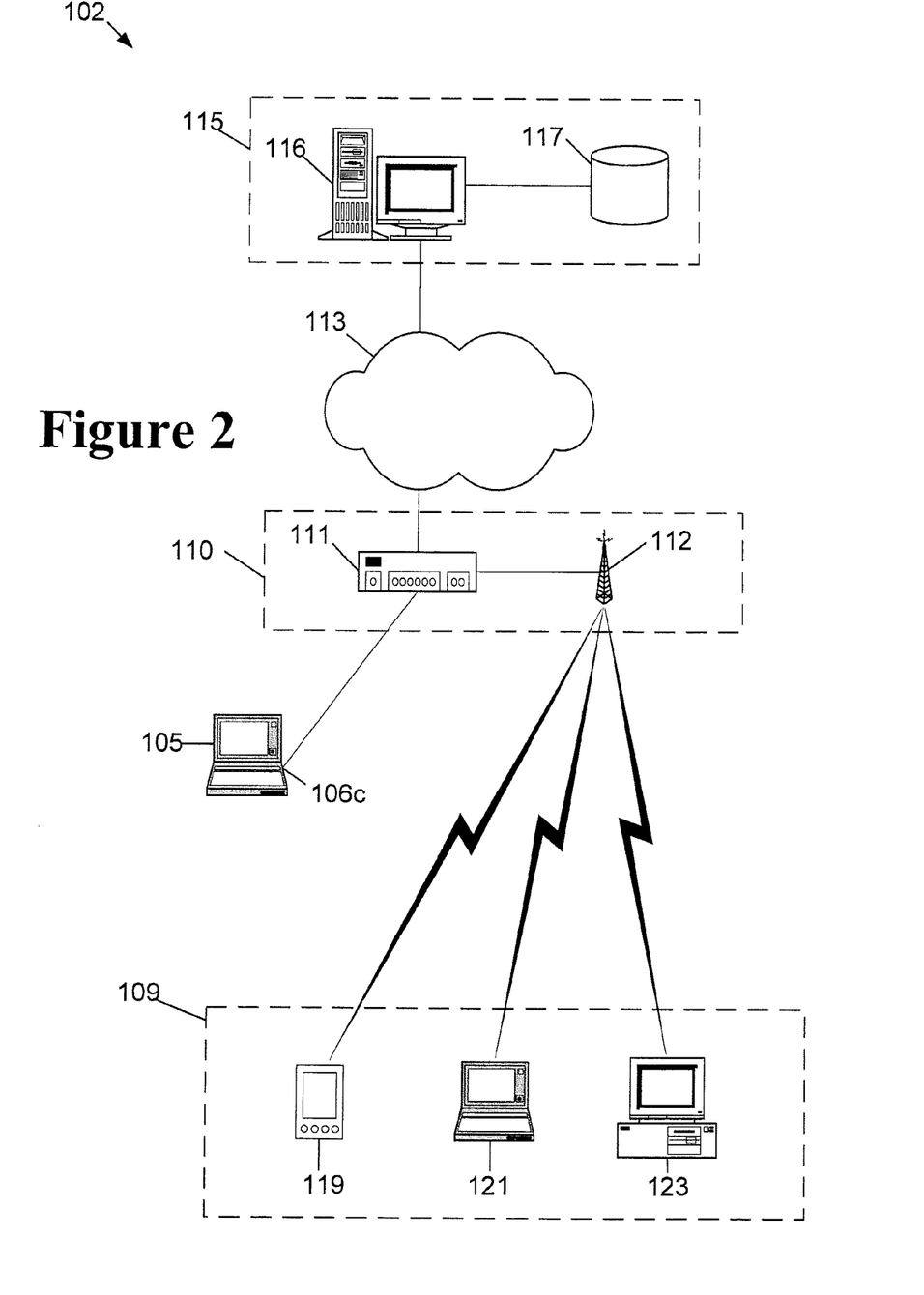
FIG. 2 shows a system for providing authenticated wireless access to a network according to an embodiment of the invention.

Referring to FIG. 2, a wireless access point is comprised of a hotspot controller 105, and a wireless router 110 comprising a modem 111 and a wireless transceiver 112 for wireless communications. In this example, the hotspot controller 105 is linked to the wireless router 110 via an ethernet connection, although in other embodiments, other types of wired or wireless link are possible instead. In this embodiment the hotspot controller 105 is a laptop computer. Alternatively, any general purpose computer can be used. In this embodiment, the hotspot controller 105 is configured to control access to the internet. However, in alternative embodiments, access to a different network or resource may be controlled instead or additionally by the hotspot controller, such as a private local area network, or wide area network.

The modem 111 is connected a network 113, for example the Internet using the services of an ISP (not shown). The skilled person will understand that any other means for connecting the wireless access point to the Internet, or other network, can be used.

A server 115 is provided at a network location on the network 113, and the server 115 is comprised of a server processor 116 and a storage means 117, which may comprise a database. The storage means 117 holds information relating to operation of the wireless router and information relating to operation of other wireless access points which are registered with that server 115. The wireless access points which are registered with the server 115 and the server 115 itself form a group of wireless access points, any of which can be used by subscribers to the network, as is explained below.

A wireless enabled device 109 in range of the wireless router 110 can be connected to the network 113 through the wireless access point 112. The wireless enabled device 109 may be a personal digital assistant (PDA) 119, a laptop 121, a desktop computer 123 or other device which can be connected wirelessly to the access point 112.

The hotspot controller 105 is loaded with software which controls access to the network 113 in conjunction with the server 115. The code required to install the software is available from the server 115 and can be downloaded over the network 113. No software is required to be installed on any of the wireless enabled devices 109 in order to connect to the network 113 through the wireless access point 112, other than industry standard wireless utility software which enables access to any compliant wireless network. Such wireless enabled devices 109 are typically compliant with the IEEE 802.11 specification and/or the Bluetooth® specification. This invention is not limited to wireless enabled devices 109 and base stations or access points compliant with these specifications, rather the invention can be implemented for any such devices which can be connected wired or wirelessly. The wireless router is connected to a port 6c of the wireless access point controller 105.

As well as the storage means 117 containing information about the wireless access point controller 105 registered at the server 115, it also contains data about end users of wireless enabled devices 109 who subscribe to the system.

In use, when a wireless enabled device 109 is in range of the wireless router it detects the presence of the wireless access point 112 and a wireless connection can be initiated between the wireless enabled device 109 and the wireless access point 112. When a web browser application is run on the wireless enabled device 109, the software installed on the wireless access point controller 105 causes a login/sign-up page to be displayed on the web browser.

If the end user of the wireless enabled device 109 is not a subscriber of the access service to the network (e.g. internet) provided by the wireless router and the server 115, then the end user can enter personal information which is transmitted via the wireless router and the network 113 to the server processor 116, and which is stored on the storage device 117, thereby registering the end user. Various subscription plans may be used, and some examples are described in WO2006/021784.

Once registered, end user access may be authenticated by providing a username and password, or other code that identifies the user, such as a text message, a PIN number e.g. for a prepaid account, etc, or by providing a media access control (MAC) address of the device to the server 115.

When the user of a wireless enabled device 109 logs in, the access point controller 105 may check with the server 115 if the user of the wireless enabled device 109 can be connected to the Internet 113 via the wireless router. The server 115 checks the subscription information stored in the storage means 117 and, if appropriate, authorizes the access point controller 105 to allow full access to the network 113 to the end user of the wireless enabled device 109. In this manner, the server 115 acts as an authenticating means for authenticating the wireless access point 112 to connect the wireless enabled device 109 to the network via the wireless access point 112. Network traffic is sent from the wireless enabled device 109 to the wireless access point controller 105 via the access point 112, the wireless router, and network interface card 106c of the hotspot controller 105. The hotspot controller 105 authenticates access to the network 113 and forwards the network traffic back to the wireless router 110, for onward transmission to the network 113. Network traffic from the network 113 to the wireless enabled device 109 is transmitted from the network 113 to the modem 111, from the modem 111 to the hotspot controller 105, where the destination may be verified as an authorised user. The hotspot controller 105 then sends the data to the wireless router, via network interface card 106c of the hotspot controller 105, to the wireless access point 112 and then to the wireless enabled device 109.

In other embodiments, the user authentication information may be stored locally on the hotspot controller 105 for known local guest users, to allow the guest users to connect to the network 113 even without verification from the server 115.

An advantage of the system 2 of FIG. 2 is that only a single network interface card 106c is required on the wireless access point controller 5 for the system 102 to operate.

This can significantly speed up the setting up and indeed the data transfer from one sub-network to the other. The network interface card may be a removable adaptor for connecting to a computing device, either externally or internally, or it may be built in to the hardware of the computer, for example, built into the computer motherboard.

A system such as that of FIG. 2, in which the hotspot controller has a wired link to the router, provides extra security. However, it is also possible to replace this wired link with a wireless link, although this may result in a lower level of security.

Figure 3:
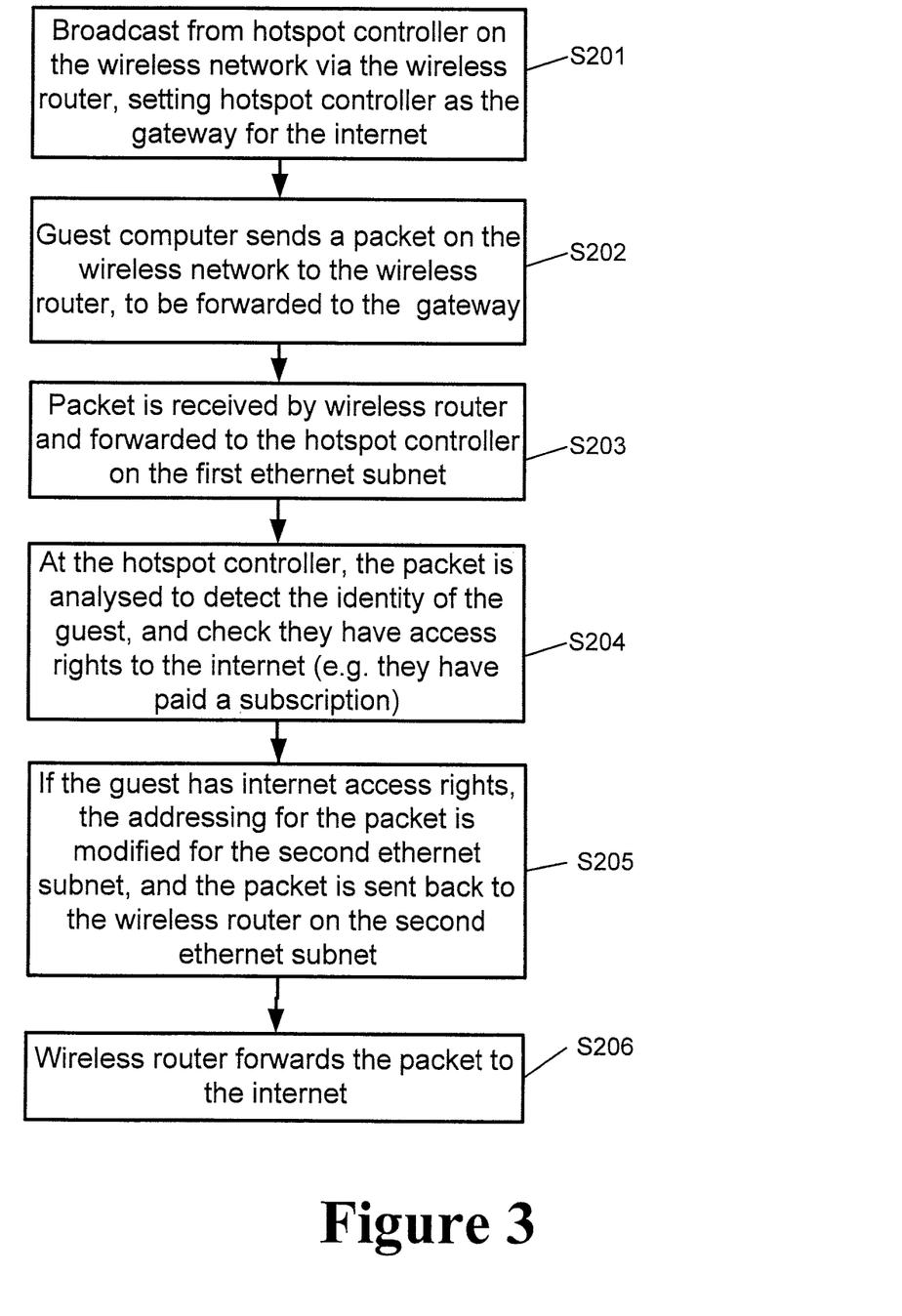
FIG. 3 shows a flowchart of data transfer from a guest computer to the internet, in an embodiment of the invention.

FIG. 3 is a flowchart showing the process of sending data from a guest user's computer 109 to the internet. At step S201, the hotspot controller 105 makes a broadcast on the wireless network, via the wireless access point 112 in the wireless router 110, informing stations on the wireless network that the hotspot controller 105 is in fact the gateway to the internet, instead of the wireless router 110 being the gateway. The wireless router 110 will also be making broadcasts, indicating that it is the gateway to the internet. Thus, the hotspot controller 105 sends a much higher frequency of such broadcasts, so that a station listening on the wireless network has a much greater probability of detecting the broadcast message from the hotspot controller 105 stating that the hotspot controller 105 is the gateway, rather than detecting a broadcast from the wireless router 110 stating that it is the gateway. This almost guarantees a station attempting to connect to the wireless network will be subject to internet access control by the hotspot controller 105.

For example, in IEEE 802.11 networks, a beacon is broadcast by an access point (AP) to indicate to stations on the wireless network that the AP is present. The beacon normally includes an SSID (Service Set Identifier) for the AP, the time, capabilities, supported data rates, and physical layer parameter sets that allow smooth regulation of the wireless network. The SSID is a 1 to 32 byte value that labels the wireless network, and allows stations using one network to ignore another network. Thus, the hotspot controller may generate a beacon over the same SSID as the wireless router, so that a user scanning for a network will not see the beacon broadcasts generated by the hotspot controller and by the wireless router as being from two separate networks.

The hotspot controller 105 is connected to the wireless router 110 via an Ethernet connection, in this embodiment. It therefore sends its wireless broadcast message to the wireless access point 112 in the wireless router 110, via the Ethernet link to the wireless router 110.

In this embodiment, there is only a single wireless access point 112, which is part of the wireless router. In alternative embodiments, additional wireless access points may be provided.

In this embodiment the wireless access point 112 and the modem 111 are both part of a wireless router 110. In alternative embodiments, they may be separate, and the wireless access point 112 may be connected to the modem 111 via an Ethernet link or some other kind of link. In yet further embodiments, with a wireless router 110, the wireless router 110 may have embedded software to implement hotspot controller functionality, so that the modem 111, wireless access point 112 and hotspot controller 105 are all provided in the same physical device.

At step S202, the guest user's computer 109 generates a packet including data to be sent to a location on the internet. The guest user's packet is sent over the wireless network to the access point 112 at the wireless router 110, and configured so that it is forwarded to the hotspot controller 105 as a gateway to the internet 113, which occurs at step S203.

At step S204, at the hotspot controller 105, the packet is analysed to determine whether the guest user is a registered user, who is authorised to connect to the internet 113. In one example, the guest user is already registered with the hotspot controller 105 and/or the server 115, so that the user is known to the system as an authorised user, and the process then proceeds to step S205. If the guest user is not already authorised to use the system, the hotspot controller 105 may initiate a registration process, i.e. by allowing limited internet access to the guest and/or by contacting the server 115 and accepting registration details from the guest user. The guest user may also provide payment details, such as a credit card or voucher number, or a simple username and password to gain permission to access the internet. After registration of the guest user and when any necessary pre-payment has been arranged, the process then continues to step S205.

The hotspot controller 105 is configured to connect to two separate sub-networks, using a single network interface card (NIC). The first of these sub-networks is for traffic between the guest user's computers 119, 121, 123 on the wireless network and the hotspot controller 105. The second sub-network is between the hotspot controller 105 and the internet 113. For example, the first sub-network may have IP addresses of the form 10.0.1.x, and the second sub-network may have IP addresses of the form 10.0.2.x. This division into two sub-networks is what allows the hotspot controller 105 to control the guest access to the internet. At step S205, after the hotspot controller 105 has received and analysed a packet sent from a guest user's computer, which is intended for a location on the internet, the network interface card 106c in the hotspot controller then transfers the packet from one sub-network to the other, to allow it to continue on its journey to its final destination on the internet, at step S206.

A similar process takes place for traffic from the internet to a guest user's computer 109, including the packet analysis, guest user authentication, and transfer of the packet from one sub-network to the other.

Figure 4:
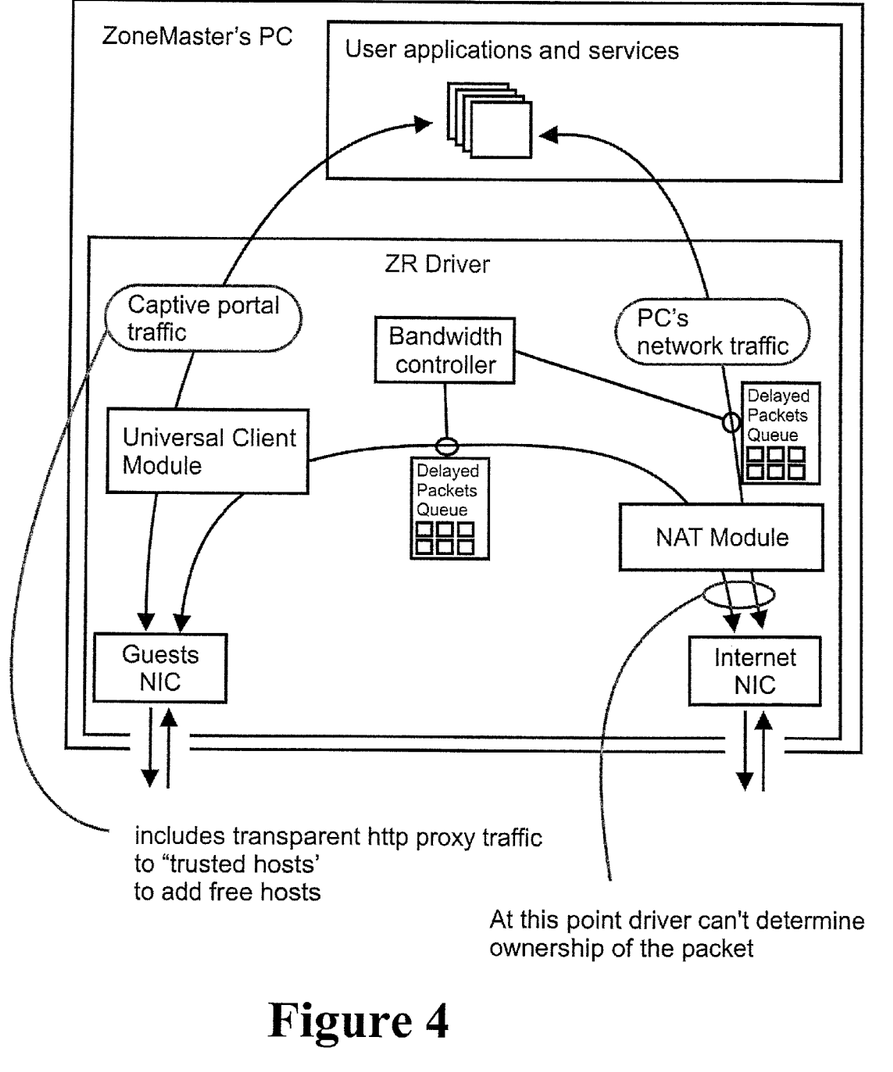
FIG. 4 shows a block diagram of a network interface driver for the hotspot controller, in an embodiment of the invention.

FIG. 4 shows a block diagram of the hotspot controller, including driver software for controlling the network interface card 106e to transfer packets from one sub-network to the other in either direction. The figure shows an upper box, representing the user applications and services on the hotspot controller 105. Below that is a lower box, representing the driver for transferring data from one sub-network to the other. The driver includes a guest NIC controller and an internet NIC controller. Although these are shown as separate units, they both control the same single hardware network interface card, in a manner which makes it appear as a separate NIC to each sub-network. Data can be transferred between the two sub-networks and/or sent to or received from the user applications and services, and this is indicated by arrows in the figure, indicating possible data flow.

Packets going to or from the guest sub-network may also pass through a universal client module. This module performs the function of translating a fixed IP that may be present on a guest device 109 that does not correspond to the hotspot's (guest) subnet.

The driver may also include a bandwidth controller which controls delayed packet queues for traffic going to either of the two sub-networks. A NAT (Network Address Translation) module is provided for incoming and outgoing traffic associated with the internet sub-network.

It is not essential to make any adaptations to the router settings to perform the invention, and the embodiments of the invention will work on a standard home-use wireless router. In this embodiment, standard encryption methods such as WEP and WPA are not used on the wireless network. However, other types of data encryption or other protection may be used, such as SSL, or security measures provided by the use of a VPN (virtual private network) between the hotspot controller and the guest computer.

As a precautionary measure the hotspot controller can defend against certain computers who may attempt to by-pass the hotspot process, and in effect, get free access to the internet. This is achieved by the driver configuring the ARP (address resolution protocol) table of the network, hence directing traffic to the hotspot controller, via the universal client.

The hotspot controller may store a list of computers or users with free access to the network gateway, e.g. computers or users who do not have to pay for internet access. This can be done on a hardware basis, e.g. storing MAC addresses, or on a user basis, e.g. storing user IDs.

If the hotspot controller 105 detects attempts to by-pass the hotspot controller 105 by computers that already established a connection either with a fixed IP address corresponding to the hotspot (guest) subnet or previous established connection before hotspot was running or configured, it may use a more aggressive broadcasting policy, and ARP manipulation for example, by increasing the frequency at which it broadcasts these messages to the wireless network thus indicating that it is the gateway to the wireless network.

In some embodiments, the hotspot controller software is provided with a variable setting to select how frequently the wireless broadcasts are performed. This may be wholly or partly a user-selected value, or it may be automatically set. For example, it may be automatically increased whenever a by-pass attempt on the hotspot controller is detected, and decreased if no by-pass attempts are detected in a given time period.

Embodiments of the invention, using a single network interface card, may operate with a faster data transfer speed than prior art devices using two separate network cards, due to the reduced time to pass the data from one network to the other.

The present invention can be implemented in dedicated hardware, using a programmable digital controller suitably programmed, or using a combination of hardware and software.

Alternatively, the present invention can be implemented by software or programmable computing apparatus. This includes any computer, including PDA's (personal digital assistants), mobile phones, etc. The code for each process in the methods according to the invention may be modular, or may be arranged in an alternative way to perform the same function. The methods and apparatus according to the invention are applicable to any computer with a network connection.

Thus the present invention encompasses a carrier medium carrying machine readable instructions or computer code for controlling a programmable controller, computer or number of computers as An apparatus as claimed in the invention. The carrier medium can comprise any storage medium such as a floppy disk, CD ROM, DVD ROM, hard disk, magnetic tape, or programmable memory device, or a transient medium such as an electrical, optical, microwave, RF, electromagnetic, magnetic or acoustical signal. An example of such a signal is an encoded signal carrying a computer code over a communications network, e.g. a TCP/IP signal carrying computer code over an IP network such as the Internet, an intranet, or a local area network.

While the invention has been described in teems of what are at present its preferred embodiments, it will be apparent to those skilled in the art that various changes can be made to the preferred embodiments without departing from the scope of the invention, which is defined by the claims.

What is claimed is:

1. A method of operating a single network adapter, comprising a single network interface card or module, to communicate wirelessly with a first sub-network and a second sub-network, the method comprising:

setting up a first network address and routing table in the network interface card or module for use in the first sub-network;

setting up a second network address and routing table in the network interface card or module for use in the second sub-network;

using said single network interface card or module to receive data for one of the first and second sub-networks, and to re-transmit the data to the other of the first and second sub-network, using the network addresses and routing tables, wherein the first sub-network includes a network gateway and the network adapter is configured to control access from the second sub-network to the network gateway, and wherein the step of receiving data comprises receiving a request from a user via the second sub-network to access the gateway on the first sub-network, verifying the user's access rights, and allowing the user to access the gateway if and only if the user is entitled to access the gateway.

2. The method as claimed in claim 1, wherein the second sub-network comprises a NAT routable sub-network that is subservient to the first sub-network.

3. The method as claimed in claim 1, wherein the network gateway is provided by a wireless internet router, the first and second sub-network belong to a wireless network, and the method further comprises:

generating broadcasts to inform wireless stations that the single network adapter is an internet gateway, and sending the broadcasts to the wireless internet router for forwarding to the wireless network.

4. The method as claimed in claim 3, further comprising generating and sending said broadcasts on the wireless network at a sufficient rate to override broadcasts from the wireless internet router which indicates the wireless internet router to be an internet gateway.

5. The method as claimed in claim 4, further comprising automatically detecting packets on at least one of the first and second sub-networks that are not using the hotspot controller as the network gateway, and automatically adjusting the frequency of said broadcasts on the wireless network which set the network adapter as the network gateway, according to the number of such packets that are detected.

6. The method as claimed in claim 3, further comprising receiving a user instruction to adjust the rate of generating and sending said broadcasts on the wireless network setting the network adapter as the gateway, and adjusting said rate according to the user instruction.

7. The method as claimed in claim 1, wherein said verifying comprises retrieving locally or remotely stored user subscription information or information about user permissions to access the gateway.

8. The method as claimed in claim 1, further comprising controlling an allocated bandwidth through the gateway for users connecting via the second sub-network.

9. The method as claimed in claim 1, wherein said method is performed by executing driver software to configure a standard network adapter to exchange network traffic between the first and second sub-networks.

10. The method as claimed in claim 1, wherein the step of receiving data comprises authorising and authenticating a user.

11. The method as claimed in claim 1, wherein the second sub-network includes a plurality of devices, said plurality of devices incorporating a respective plurality of network interface cards or modules, said network interface card or module being configured to communicate directly with said plurality of network interface cards or modules.

12. The method as claimed in claim 1, wherein the first sub-network and second sub-network are within wireless communication range of said single network interface card or module.

13. A computing apparatus for exchanging network data traffic between a first sub-network and a second sub-network, the apparatus comprising:

a network adapter, comprising a single network interface card or module, for communicating wirelessly with the first sub-network and second sub-network;

a processor;

a data store storing a driver for the network interface card or module, the driver being configured to store a first network address and routing table for use in the first sub-network; a second network address and routing table for use in the second sub-network; to operate said single network interface card or module to receive data for one of the first and second sub-networks and to re-transmit the data to the other of the first and second sub-network, using the network addresses and routing tables, wherein the first sub-network includes a network gateway and the network interface card or module is configured to control access from the second sub-network to the network gateway and comprises an authentication controller for receiving a request from a user via the second sub-network to access the gateway on the first sub-network, verifying the user's access rights, and allowing the user to access the gateway if the user is entitled to access the gateway, or blocking the user access to the gateway if the user is not entitled to access the gateway.

14. The apparatus as claimed in claim 13, wherein the network gateway is provided by a wireless internet router, the first and second sub-network belong to a wireless network, and the apparatus further comprises a transmitter for generating broadcasts to inform stations that the single network adapter is an internet gateway, and sending the broadcasts to the wireless internet router for forwarding to the wireless network.

15. The apparatus as claimed in claim 14, wherein the transmitter is configured to generate and send said broadcasts on the wireless network at a sufficient rate to override broadcasts from the wireless internet router which indicates the wireless internet router to be an internet gateway.

16. The apparatus as claimed in claim 15, further comprising a packet detector for automatically detecting packets on at least one of the first and second sub-networks that are not using the hotspot controller as the network gateway, and automatically adjusting the frequency of said broadcasts on the wireless network which set the network adapter to as the network gateway, according to the number of such packets that are detected.

17. The apparatus as claimed in claim 13, wherein the authentication controller comprises locally stored user subscription information or information about user permissions to access the gateway, or a retrieval system for retrieving user subscription information or information about user permissions from a remote location.

18. The apparatus as claimed in claim 13, wherein the authentication controller is programmed to authorise and authenticate a user.

19. A method of operating a single network adapter consisting of a single network interface card or module for communicating with a local area network that includes a first sub-network and a second sub-network of the same type, the second sub-network including a plurality of devices, said plurality of devices incorporating a respective plurality of network interface cards or modules, said network interface card or module being configured to communicate directly with said plurality of network interface cards or modules, and the method comprising:

- setting up a first network address and routing table in the network interface card or module for use in the first sub-network;
- setting up a second network address and routing table in the network interface card or module for use in the second sub-network;
- using the network interface card or module to receive data for one of the first and second sub-networks, and to re-transmit the data to the other of the first and second sub-network, using the network addresses and routing tables,
- wherein the first sub-network includes a network gateway and the network interface card or module is configured as a hotspot controller to control access from the second sub-network to the network gateway, and
- wherein the step of receiving data comprises receiving a request from a user via the second sub-network to access the gateway on the first sub-network, verifying the user's access rights, and allowing the user to access the gateway if and only if the user is entitled to access the gateway.

* * * * *